United States Patent

[11] 3,587,629

[72] Inventor Kenneth G. Bright
  Camas Valley, Oreg.
[21] Appl. No. 868,368
[22] Filed Oct. 22, 1969
[45] Patented June 28, 1971
[73] Assignee Henkels and McCoy, Inc.
  Blue Bell, Pa.

[54] VARIABLE RELIEF MEANS FOR A HYDRAULIC DRIVE
  8 Claims, 4 Drawing Figs.
[52] U.S. Cl..................................................... 137/484.2,
  137/489
[51] Int. Cl................................................. F16k 17/18
[50] Field of Search........................................ 137/489,
  484.2

[56] References Cited
  UNITED STATES PATENTS
  346,898 8/1886 Curtis........................... 137/489X Primary Examiner—M. Cary Nelson
Assistant Examiner—R. B. Rothman
Attorney—James D. Givnan, Jr.

ABSTRACT: Variable relief means for a hydraulic drive are disclosed for incorporation into a hydraulic drive arrangement to cushion the drive from sudden pressure buildups as when the driven instrumentality encounters irregular resistance. A cylinder receives a transient flow constituting a portion of a hydraulic pumps output. A piston within the cylinder houses orifices through which fluid escape is metered. In communication with the cylinder interior is a relief valve. A remote pilot valve controls the relieving pressure of the relief valve. Linkage interconnects the remote pilot valve and the piston whereby upon piston movement resulting from a sudden pressure buildup, the pilot valve will gradually increase the pressure setting at which the relief valve will function. Accordingly pressure is gradually increased to the opening pressure value of a main relief valve in the drive system for complete system unloading.

Fig. 1

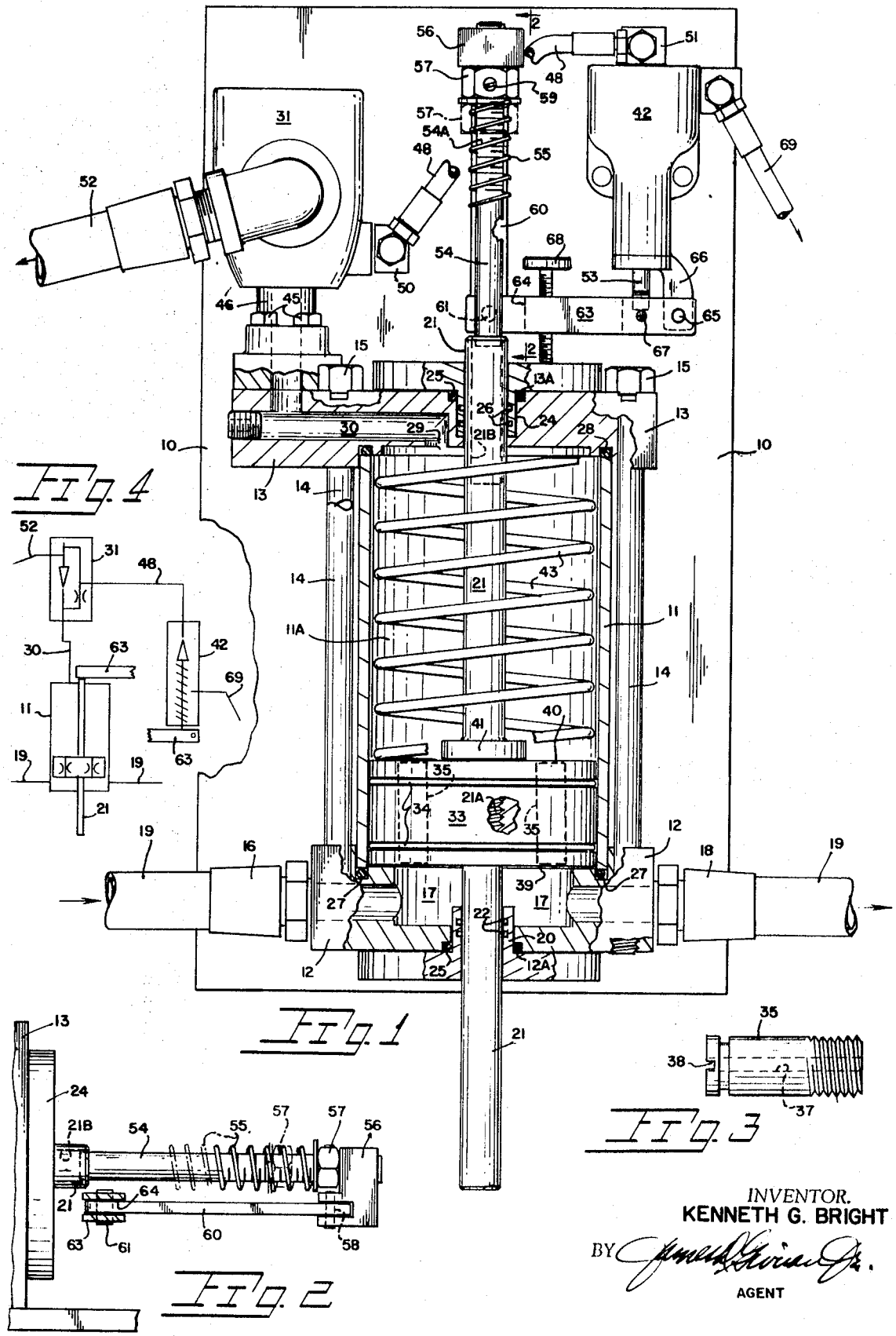

3,587,629

VARIABLE RELIEF MEANS FOR A HYDRAULIC DRIVE

BACKGROUND OF THE INVENTION

The present invention relates generally to relief means for hydraulic systems and more particularly to a variable relief means operable at increasing pressure for use in a hydraulic system to permit gradual pressure increase in the system to avoid undesirable rapid pressure fluctuations.

It has been found highly useful to incorporate the present invention into ditching machines having, in an exemplary manner, a continuous toothed digging chain operable as the machine slowly advances along its course. The machines engine jointly propels the vehicle and simultaneously powers the digging chain both through drive components of which at least some are in related and direct mechanical drive. In operation of the machine, the ground resistance or obstructions to the digging chain will vary considerably from simply slowing the speed of the ditching machine, to actually stopping the machine. Such encountering of trenching obstructions results in sudden loads being exerted on the chain's drive components which, in view of their relationship with the machines track driving components, results in rapid changes in the torque ultimately delivered to the track drive components. Obviously this varying of torque to such components (the differential primarily) causes rapid part wear and early failure. The use of adjustable clutches in the digging chain drive has failed to remedy the problem.

Additionally, in regard to wear of the machines drive components, the jerky forward movement characteristic of such machines results from the digger chain teeth encountering obstructions preventing steady forward movement of the machines chain carrying bar. This results in rearward jerking of the bar on the machine chassis causing erratic loading of the vehicle drive components.

The foregoing is by way of setting forth existing problems in the field of ditch digging equipment and in no way is it intended to imply restriction of the application of the present invention to use with such digging equipment.

To remedy the foregoing problem of severe wear on the machines drive components I have incorporated a hydraulic drive into the ditching machine to simultaneously power both the traction elements and the digging chain. Associated with this hydraulic drive is the fluid cushioning means embodying the present invention. Other useful environments for the invention will become apparent as the invention is further elaborated upon. Provision is made for receiving a quantity of the pumps output when the line pressure between pump and motor exceeds a normal operation pressure.

By way of example, when the digging chain encounters minor momentary obstructions the resultant momentary loading of the hydraulic motor results in a pressure increase in its fluid supply line which increase is alleviated by temporary diversion of the fluid into and through a chamber. Upon the digger bar and chain passing the ground obstruction the supply line pressure returns to normal with entire pump output again directed to said motor.

Important to the invention are means responsive to the rate of fluid pressure increase. When a sudden pressure buildup in the motor supply line occurs as from stoppage of the digging teeth by a rock, a piston is displaced by the fluid. An adjustable pilot valve is operatively linked with the piston and upon piston movement past a settable point the operating pressure of the pilot valve will progressively increase thus increasing its associated relief valve cracking or venting pressure. Accordingly as the increasing pressure in the motor supply line causes rearward travel of the piston a transient volume of fluid is accumulated in the expansible chamber. In most instances the increased pressure will ultimately cause the digger tooth to overcome the obstacle, followed by return of the system to normal pressure. During this time the pilot valve may operate to open the relief valve at a preset pressure valve somewhat above normal operating pressure. In cases where the obstacle is not so easily overcome the line pressure will build causing further piston movement, at which time it will act via linkage on the pilot valve to raise or increase the value at which the relief valve will vent or unload. By gradual movement of the piston, accomplished by orifices or ports therein, a greater operating pressure for the chain driving motor is gradually achieved without physical shock to the components. Accordingly the pressure buildup may progress at a relatively slow rate up to a main relief valve dumping pressure. For instance, assuming the obstacle is not overcome and the digging chain is momentarily stopped the gradually building pressure will cause the pilot valve to eventually close off the venting port of the present relief valve at which time hydraulic pressure will build until a system main relief valve, having a preset maximum value, will unload the entire pump output to the system tank.

This extreme example will be accomplished without fluid lock or resulting shock occurring to the hydraulic system. The hydraulic motors speed will of course vary with amount of oil being dumped, deceleration rate will be in relation to severity of obstruction and resultant piston movement.

BRIEF DESCRIPTION OF THE DRAWING

In the accompanying drawing:

FIG. 1 is a plan view of the variable relief means with some components sectioned for illustrative purposes, FIG. 2 is a view taken along line 2-2 of FIG. 1 showing details of the linkage for activating the pilot valve, FIG. 3 is a view of a piston insert removed from its piston, and FIG. 4 is a schematic of the present invention.

DESCRIPTION OF PREFERRED EMBODIMENTS

With continuing regard to the drawing wherein applied reference numerals indicate parts similarly identified in the following specification, the reference numeral 10 indicates a base plate for the mounting of components of the variable relief means.

A cylinder 11, shown sectioned and defining a chamber 11A, is confined intermediate a forward end plate 12 and a rear end plate 13 interconnected adjacent their corners by four strain rods 14, the rearward ends of which receive nut elements 15. The forward end plate 12 receives a hose end fitting 16 to admit pump discharged fluid from a pressure line 19 into an annular recess 17 in the end plate 12 while a similar fitting 18 directs fluid toward one or more hydraulic motors not shown. Each end plate is suitably secured to the underlying base plate 10. Centrally located within end plate 12 is a bushing 20 slidably engaging one end of a piston rod 21. The bushing 20 incorporates O-Ring seals as at 22 and is secured to the plate 12 by machine screws.

Rear end plate 13 similarly mounts a like bushing at 24 retaining O-rings at 26. Each end plate is annularly recessed to receive the opposite ends of the cylinder 11 with a seal effected between the ends of the cylinder and the end plates by large diameter O-rings 27 and 28. The latter are confined within annular grooves machined on a radius to locate the O-rings 27—28 to receive the end surfaces of the cylinder. Further, the end plates 12—13 are shouldered at 12A—13A to receive O-rings 25.

A port is located on the interior surface of end plate 13 for communication with a fluid exhaust passageway at 30 for fluid communication with a relief valve at 31.

The piston rod 21 extends through the end plates 12 and 13 and is threaded at 21A to receive a piston 33 having O-rings at 34. Said piston and piston rod comprise a piston assembly. Providing fluid communication from the pistons front side at 39 to the opposite or rear face 40 are piston inserts 35 having fluid passageways 37 therethrough constituting orifice means. Each orifice insert is further provided with a slot 38 to permit torquing of the insert into securement within partially threaded piston bores. Accordingly the flow rate through the piston may be varied by substitution of other inserts having different diameter passageways 37 to accommodate the particular installation requirements. A flange 41 on the piston rod abuts against the piston to secure same in place. Extending inwardly from the rearward end of the piston rod is a bore 21B of a diameter to permit telescopic advancement over a part of the linkage for control of a remote pilot valve indicated at 42.

A helical spring 43 is concentrically disposed about the piston rod 21 between the back face of the piston and the rear end plate 13 the spring functioning to bias the piston and piston rod assembly to the forward position shown.

Affixed by machine screws 45 to the back side of the rear end plate 13 is a relief valve coupling 46. The relief valve 31 accordingly is in fluid communication with the chamber 11A defined by the cylinder 11.

The relief valve and its associated remote pilot valve 42 are in communication via hydraulic hose segment 48. Suitable fittings as at 50 on the relief valve and at 51 on the pilot valve communicate fluid to the pilot valve through a restricted orifice in the relief valve. The operating relationship of a relief valve to a remote pilot valve is believed well known in the art and is summarized by saying that at a set, predetermined pressure value the pilot valve will allow venting of the associated relief valve. In effect a port in the relief valve is opened to allow fluid escape back to a reservoir. A reservoir return line is indicated at 52. The mechanical structure description of the two valves is not believed necessary as they are conventional. For practical purposes, relief and pilot valves manufactured by the Dennison Division of the Abex Corporation, series R2 and REO4 respectively, have been found suitable.

The following described pilot valve linkage is actuated by the piston rod at a point in its rearward movement and functions to vary the loading on the pilot stem 53 (FIG. 4) the end of which protrudes from the pilot valve. Piston rod movement rearwardly beyond said point effects an increase in the loading of the pilot stem and consequently an increase in the pressure value at which the relief valve will open. The linkage includes a control rod 54 threaded at 54A and axially aligned with the piston rod 21. The diameter of rod 54 is of a size to admit telescopic advancement of the bored end 21B of the rearwardly moving piston rod 21. Contactable by the rearward end of the piston rod is a control rod spring 55 which upon being contacted resiliently imparts movement to a control rod support member 56 within which the end of said rod is secured. An adjustable and lockable nut 57 maybe advanced forwardly along rod 54 to position spring 55 to thereby determine the point of contact with the end of piston rod 21. In pinned engagement at 58 (FIG. 2) with the member 56 is a connecting link 60 similarly secured at its forward end at 61 to permit slight lateral movement of the link as later explained. A set screw 59 locks the nut 57 in its adjusted position.

A pilot valve lever 63 is bifurcated at 64 to receive the end of the link 60 and the pivot pin 61. The opposite end of lever 63 is also bifurcated and is swingably mounted at 65 to a bracket 66 affixed to and part of the pilot valve. The pilot stem 53 extends outwardly of the pilot valve body terminating in abutment with a pin 67 secured in the pilot valve lever and from this arrangement it will be apparent that the lever 63, upon rearward movement initiated by piston rod movement, the loading of the pilot stem 53 will increase. A tank return line at 69 is provided for the pilot valve 42.

An adjusting screw 68 is for manually presetting the load on the pilot stem to determine the pressure value at which the relief valve 31 will start venting to the reservoir. This pressure value will remain constant until piston assembly movement influences the rearward biasing of the above described linkage.

The following operation of the present variable relief means is set forth in relationship to a digging machine, applications in other hydraulic drive systems are believed apparent.

In conventional digging machines of the self-propelled type both front and rear axles are powered each having a differential. Engine output is delivered through a transmission, hydraulic pump and motor with the latter delivering power via a roller chain and divider box to the two separate axle drive lines of the vehicle. The hydraulic motor additionally drives, through V-belts, associated sprockets and clutch the linked teeth of a digging chain. The chain is entrained about a chain bar which bar is arcuately positionable within a vertical plane to determine the digging depth.

From the above it will be seen that severe sudden loads may be imparted from the digging chain back through the vehicle drive lines to each differential whereat failure most commonly occurs. The erratic application of such loads occurs primarily when the digging bar is operating at a shallow angle relative to the grounds surface. Any obstacle encountered by a tooth is translated into a rearward pull on the digging bar and ultimately the chassis of the machine. When the digging bar is more nearly in perpendicular relationship to the ground surface such a force is primarily downward on the vehicle.

The existing arrangement of both vehicle and chain drive components above set out is varied in the following manner. A positive displacement hydraulic pump is driven by the transmission output shaft. The pump output is discharged past system main relief valve thence the present invention. A pair of directional valves receive the flow in pressure line 19, the first of which may direct the flow simultaneously to the digging chain motor and the vehicle traction motor with the fluid to the latter being regulated by a needle valve. The second directional valve downstream from the first may direct the entire flow to the traction motor being rendered with the chain motor inoperative.

During normal trenching a flow is directed through the recess at 17 at the forward end of the cylinder 11 with fluid at the same pressure occupying the chamber area 11A rearward of the piston; the exhaust passageway 30; the relief and pilot valves and their interconnecting line 48. A description is provided as follows for a slow building and subsequently for a rapid pressure buildup.

When the digger teeth gradually encounter more resistance, the line pressure will increase resulting in a pressure increase in chamber 11A, passageway 30, relief and pilot valves and line 48. If the buildup continues the relief valve will eventually vent and unload to the reservoir. Valve 31 must vent before any flow through orifices can occur. There is a pressure differential between cracking and full open positions in the relief valve. The pressure at which this unloading occurs is determined by the manually preset adjusting screw 68. The resulting escape of fluid from the area rearward of piston 33 in combination with the elevated line pressure results in a fluid flow through the orifices in the inserts 35. Under this condition when the piston insert orifices cannot pass fluid at the same rate fluid is being dumped by the relief valve the greater the pressure now exerted on the front piston face 39 will cause rearward piston movement. Assuming passage of the digger bar past the obstruction occurs before the end of rod 21 contacts spring 55 the system will return to normal all occurring with relatively rapid pressure fluctuations being averted. During this function the partial rearward movement of the end of piston rod 21 has not occurred to the extent necessary to effect movement of spring 55 and the pilot valve linkage from its static position.

In case of rapid increase in line pressure as by the digging teeth encountering hard ground material that presents sustained resistance to tooth passage, the pressure increase will eventually result in full rearward movement of the piston and piston rod assembly. While some fluid escape will occur through the piston insert orifices 37 and the venting relief valve 31 the flow is inadequate during a rapid pressure buildup to prevent a positive pressure differential on the front side of the piston. The pressure differential will cause rearward movement of the piston 33 as the transient fluid rearward of the piston is vented by the pilot controlled relief valve. The piston and its integral piston rod 21 will move rearwardly the rear end of the latter advancing past the presently stationary control rod 54. Further movement will result in the control rod spring 55 being contacted and partially compressed to cause the link 60 and pilot valve lever to be rearwardly biased thus increasing the load of lever 63 on the pilot stem 53.

The pressure at which the relief valve will unload is thus increased over its manually preset (adjusting screw 68) value. Under a given condition the size of the orifices 37 in the piston inserts will determine how rapidly the piston will move rearwardly to the full rear position. With piston 33 gradually moved to the full rear position the pilot 53 is gradually biased to a closed condition thus terminating the operation of relief valve 31. In this extreme case the system and particularly the pressure line 19 is unloaded by a system main relief valve (not shown) which may be set at a relieving pressure value to protect the system.

The desirable result achieved resides in the fact that line pressure buildup will be relatively gradual since a portion of the pumps output will be bled off during elevating line pressures. During sustained periods of elevated line pressure the bleeding off of the pumps output is gradually restricted to permit a slow building of system pressure. The slow increase in line pressure will either result in powering of the digger teeth to overcome the obstruction or system pressure building to a main relief valve (not shown) dumping pressure which will unload the entire system.

Upon the obstruction being overcome and the resumption of operating pressure in line 19 and chamber 11A the relief valve 31 will close. The spring 43 will reposition its piston 33 forwardly with fluid filling via orifices 37 the chamber area behind the piston.

The invention having now been set forth, what I claim and desire to secure under a Letters Patent is:

I claim:

1. Variable relief means for incorporation into a hydraulic drive system intermediate a source of hydraulic pressure and a powered instrumentality the latter being subject during operation to varying loads causing elevated fluid pressure in the system, said relief means comprising, a cylinder defining a chamber in fluid communication at its forward end with a pressure line through which pressurized fluid is directed to the instrumentality during normal operation, a piston-piston rod assembly within said cylinder with said piston disposed adjacent the forward end of the cylinder during normal operating pressures in said pressure line, orifice means permitting a flow of fluid to the chamber area rearward of the piston whereby during normal instumentality operation the chamber is charged with fluid under uniform pressure, a relief valve in fluid communication with the opposite end of the cylinder defined chamber and venting at a predetermined pressure value, a pilot valve in operating communication with said relief valve and including adjustable means permitting opening of said relief valve at predetermined pressure values, means linking said piston-piston rod assembly and the adjustable means of said pilot valve for translating rearward piston assembly movement into the progressive loading of said adjustable means, and said relief valve upon an elevated pressure value being reached adapted to vent the chamber and primarily that chamber area rearward of the piston whereby continued elevated pressure in the chamber area forward of the piston will cause rearward movement of the latter to progressively load via the linking means the adjustable means of the pilot valve thereby progressively increasing the pressure value at which the relief valve will vent to achieve relief valve closing in a gradual manner.

2. The variable relief means as claimed in claim 1 wherein said orifice means is housed within said piston in a manner to permit substitution of other orifice means to permit varying the flow rate to the area rearward of the piston and correspondingly the sensitivity of the piston to differential pressures.

3. The variable relief means as claim in claim 1 wherein said piston-piston rod assembly is forwardly biased by a helical spring internally disposed in said cylinder.

4. The variable relief means as claimed in claim 1 wherein said adjustable means in said pilot valve includes a stem and said linking means is operable to progressive load the stem for progressively increasing the pressure value at which said relief valve will vent.

5. The variable relief means as claimed in claim 4 wherein said linking means includes screw means for presetting the initial loading of the pilot valve stem.

6. The variable relief means as claim in claim 1 wherein said linking means includes a resilient member contactible by the piston rod upon rearward movement thereof.

7. The variable relief means as claimed in claim 6 wherein said linking means further includes a rod positionably mounting said resilient member for contact of the member by the piston rod at selected points of rearward travel of the piston rod.

8. The variable relief means as claimed in claim 7 wherein said piston rod and said rod are in telescopic relationship.